United States Patent Office 3,353,678
Patented Nov. 21, 1967

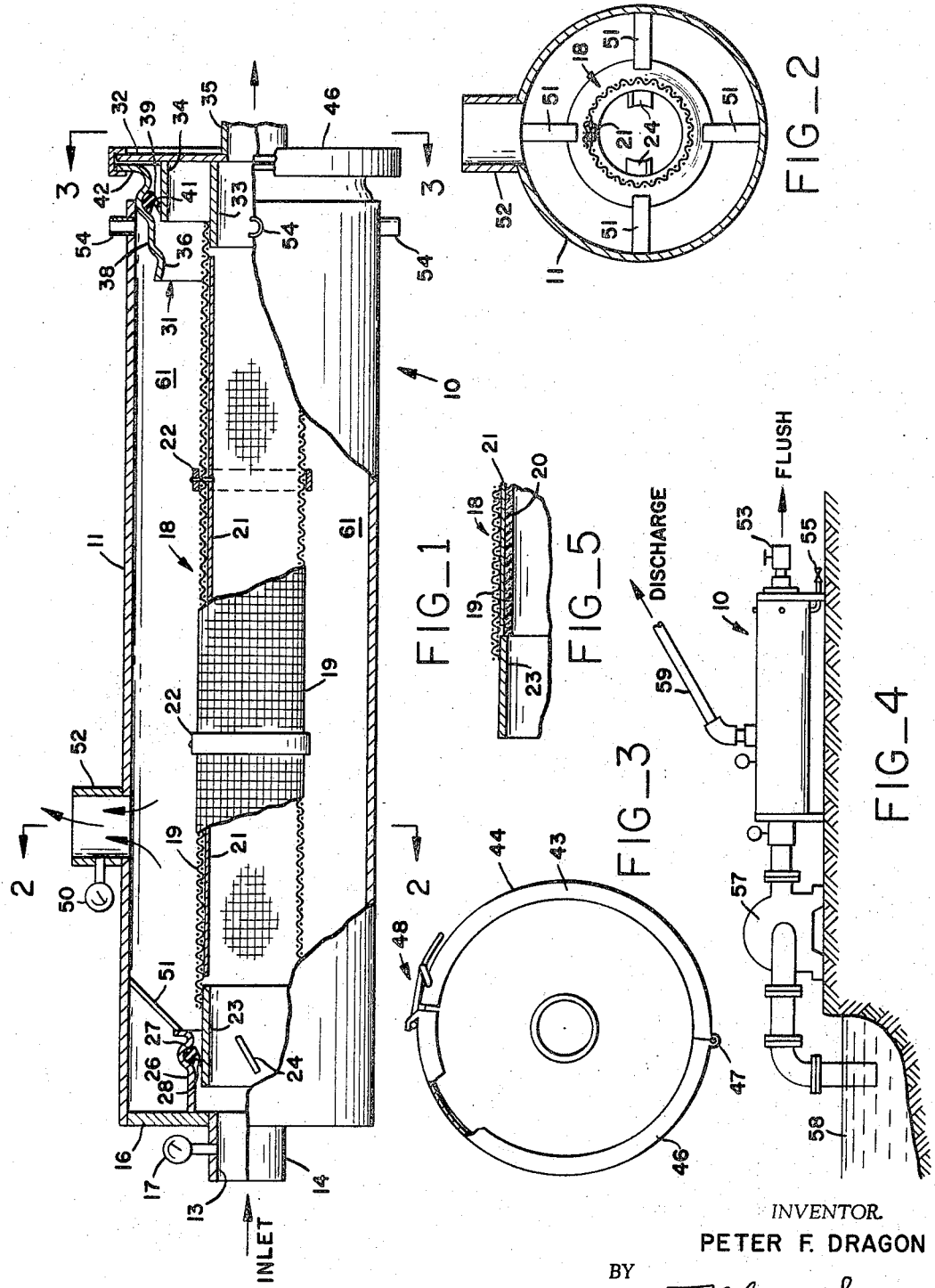

3,353,678
FILTER HAVING ASSEMBLING, SEALING AND FLUSHING MEANS
Peter F. Dragon, 5601 Castle Drive, Oakland, Calif. 94611
Filed June 22, 1965, Ser. No. 465,910
5 Claims. (Cl. 210—236)

ABSTRACT OF THE DISCLOSURE

A liquid filter including an elongate shell having an inlet at one end connecting with an inner flow passageway of a filter cartridge mounted axially in the shell on resilient seals carried in bells mounted at each end of the shell.

---

This invention relates to pressure filters such as are applicable to the removal of solids from water or other liquids.

Heretofore, there have been known pressure filters for removing foreign matter from agricultural and industrial water sources such as wells, canals, rivers, and the like. Such devices have been limited in their usefulness by special mounting requirements and by time consuming disassembly, cleaning, and assembly procedures.

It is, therefore, a general object of the invention to provide a pressure filter which will overcome the above named disadvantages.

Another object of the invention is to provide a filter of the above character which is simple in construction and which can be easily and rapidly assembled and disassembled for maintenance without the necessity of using tools.

Another object of the invention is to provide a filter of the above character which has a novel sealing arrangement which operates without the use of flanges and interposed gaskets.

Another object of the invention is to provide a filter of the above character which is effective in its filtering action and which is constructed to provide a dead space for collecting fine particles that pass the filter member.

Another object of the invention is to provide a filter of the above character which can be mounted in a variety of positions and therefore adapted for use in ditches, wells, sprinkler irrigation systems, or even domestic service, such as filtering swimming pool water.

Other objects and features of the invention will be apparent from the following description when taken in conjunction with the accompanying drawings of which:

FIGURE 1 is a longitudinal view, partly broken away and partly in cross-section, showing a filter incorporating my invention.

FIGURE 2 is a transverse cross-section view of the filter of FIGURE 1 taken along the lines 2—2.

FIGURE 3 is an end view of the filter of FIGURE 1 taken along the lines 3—3.

FIGURE 4 shows the filter of FIGURE 1 connected to appropriate associated equipment for pumping water under pressure from a stream and through the filter.

FIGURE 5 shows the filter of FIGURE 1 together with an additional filtering medium inserted therein.

Referring to the figures, the filter 10 comprises an elongated tubular casing or shell 11. One end of the shell 11 is provided with a liquid inlet 13 adapted to be connected to a liquid supply system. The inlet can be formed by a short length of pipe 14 welded to the end closure plate 16 of the shell 11. If desired, a suitable means for measuring pressure at the inlet may be provided such as the pressure gauge 17.

An elongated filter assembly or cartridge unit 18 is disposed axially within the shell 11 and extends between its ends. The cartridge unit surrounds and defines an inner-flow passageway that extends substantially the entire length of the filter. The unit 18 includes a filter membrane 19 which may be a suitable porous or foraminous member, such as a wire gauze screen, as shown. The screen 19 is self-supporting along its length. It is joined along a longitudinal side by overlapping and fastening the same to a back-up strip 21. The back-up strip 21 and circumferential bands 22 serve to retain the screen in a cylindrical shape and support it against bursting when the pressure across it builds up from plugging.

For more exacting applications wherein it is desired to remove even finer particles, such as in filtering oils and the like, additional filtering structure 20 can be readily incorporated within the cartridge. Such additional filtering structure is shown in FIGURE 5 and takes the form of an elongate cylindrical insert having outside dimensions the same as the inside dimensions of the screen. The structure 20 is constructed of a porous plastic foam having a wall thickness of about one inch. When utilized, the structure 20 is inserted inside the cartridge 18 before installing the same.

The inlet end of the unit 18 is fitted with a coupling pipe 23 which is fastened to the screen 19. A plurality of vanes 24 are mounted to the inside of the pipe 23 and lie in a helical path therein to cause the incoming liquid to swirl as it passes into the filter cartridge. This swirling or turbulence causes continuous flushing or cleaning of the screen 19 during operation.

Means is provided for detachably coupling the inlet end of the filter cartridge to the inlet 13. Such means includes a bell 26 mounted on the inner side of the end plate 16 and concentric with the opening 13. The bell is shaped to provide an annular recess 27 therein for accommodating and retaining an annular seal ring 28. This seal ring is formed of suitable resilient material such as synthetic rubber or a suitable plastic. Preferably it is chevron shaped in section. The seal ring is dimensioned so that one annular portion of the same is urged into sealing contact with the pipe 23, whereby it supports the filter cartridge at the inlet end and provides a seal between pipe 23 and bell 26. As shown, the chevron seal ring 28 is positioned so that it opens towards the pressure side of the seal, so that pressure acting on the seal ring serves to actuate its inner and outer annular portions into increased sealing engagement with the pipe 23 and bell 26.

The other end of the filter cartridge unit 18 is fitted with a head assembly 31 comprising a flange 32 having concentric inner and outer cylindrical tubular sections 33 and 34 secured to the inner side thereof, the inner section 33 being fastened to the corresponding end of the screen 19. A short pipe section 35 is secured to the outer side of flange 32 and is concentric with section 33.

Means are provided for detachably securing the head assembly 31 of the cartridge unit to the adjacent end of the shell 11. Thus, in the embodiment illustrated, a conically shaped bell 36 is attached as by welding to the end of the shell 11 remote from the inlet end. This bell is shaped to form an annular recess 38 to accommodate and retain a seal ring 39. This seal ring is likewise made of resilient material and preferably is of the chevron type. It has an annular portion 41 extending inwardly to make yielding sealing contact with the outer tubular section 34. This seal ring is also mounted to open toward the pressure side, that is to say towards the central portion of the filter, whereby pressure acting on the seal ring serves to urge its inner and outer portions apart and into additional sealing engagement with section 33 and bell 36.

The outer end of the conical bell 38 is flared outwardly as indicated at 42 so that the periphery of the flange plate 32 and the flared end of the bell are in juxtaposition. These parts are clamped together by suitable means such as by the quick disconnect band clamp 43. The clamp 43 can be constructed in a conventional manner, such as in two halves 44 and 46 pivotally connected at one side by hinge 47 and provided at the opposite side with a toggle mechanism 48 connected between the halves for closing and securing them together.

The sealing arrangement just described dispenses with the need for carefully manufactured flanges and sealing gaskets therefor as heretofore known. Yet, with this structure, there is formed a positive seal which is adapted for quick disassembly.

It is seen that the cartridge unit 18 can be readily removed from the shell by merely releasing and removing the band clamp, after which the cartridge unit is easily pulled free of the shell.

Guide means are provided to aid in aligning and centering the cartridge when the same is installed or reinserted into the shell. Thus, a plurality of inclined guide bars 51 are fastened to extend between the bell 26 and the shell 11. The guide bars, as viewed in FIGURE 1, are at an angle of the order of 45° with respect to the shell and they extend from the shell toward the opening of the bell 26 so that a cartridge of considerable length can be inserted into the shell without requiring an external alignment fixture for guiding the inlet into the cartridge up into the bell 26.

A liquid discharge outlet is provided by pipe 52 which communicates through the side of the shell 11. Pipe 52 is located nearer to the inlet end 12 than to the other end of the filter and is provided with a pressure gauge 50. When the readings of the gauges 50 and 17 differ, it is time to flush out the filter.

Flushing means can be connected to the head assembly 31 for direct, rapid discharge of liquid therefrom, and for flushing out entrapped foreign matter. Such means can include a suitable valve 53 (see FIGURE 4) connected to the pipe 35. Preferably, the gate valve is of the pressure operated type so that build up of pressure within the filter, as by clogging, automatically opens the valve to thereby flush out the entrapped solids.

Additional drainage pipes 54 communicate through the sidewall of the shell 11 near the head assembly 31. Such pipes may be small pipe nipples normally closed as by a cap or plug, the lowermost pipe 54 being provided with a valve 55. The purpose of these openings will be hereinafter disclosed.

Operation of my filter is as follows. It is assumed that a valve 53 is connected to the filter for flushing the same, and that a pump 57 is supplying a source of water to be filtered as from a canal or lake 58 (see FIGURE 4). The water, under pressure, enters through the inlet 13 and passes into the passageway within the cartridge unit 18. The water passes through the filter membrane or screen 19 and into the annular space between the filter cartridge and the shell, after which it is discharged through pipes 52 and 59. The foreign matter which is large enough to be stopped by the filter membrane is collected inside the filter cartridge, from which it can readily be discharged by occasionally opening the flushing valve 53. Further, by providing a space 61 having a relatively low flow rate between the discharge outlet pipe 52 and the flush outlet pipe 35, fine particles that pass the filter membrane are permitted to settle by gravity and collect at the bottom of the shell from whence they can easily be flushed out through the valve 55 on the drainage opening 54 which is at the lowermost position.

I claim:

1. A filter adapted to be connected to a source of water under pressure to remove solid particles therefrom comprising an elongate cylindrical shell having first and second open ends, means mounted on the shell closing said first open end and forming an inlet at the first end of said shell adapted to be connected to the source of water under pressure, means mounted on the shell forming a discharge outlet communicating through the side of the shell, an elongate filter cartridge disposed within the shell and extending substantially the entire length thereof, said cartridge including a filter membrane defining and surrounding a substantially unimpeded passageway for the flow of incoming water that extends the length of the cartridge, said cartridge having a lateral dimension substantially less than the corresponding dimension of the shell to provide a space between the cartridge and the shell, first sealing means for detachably coupling one end of the filter cartridge to the means forming the inlet to provide a substantially watertight seal therebetween, said filter cartridge including a head assembly for detachably coupling the other end of the filter cartridge to the second end of the shell, second sealing means forming a substantially watertight seal between the head assembly and the second open end of the shell to close said second open end, means mounted on the head assembly forming a first flush opening in communication with the passageway in said filter cartridge and in general alignment therewith for flushing out solids trapped in the cartridge, means for closing said first flush opening, means forming a second flush opening communicating with said space adjacent the second end of the shell for flushing out the fine particles collected at said end, and means for closing said second flush opening, said means forming said discharge outlet being located a substantial distance away from the second end of the shell so that the incoming water travels through the cartridge and out the discharge outlet, while the momentum of solid particles and fines carries them beyond the discharge outlet and toward the second end of the shell where a relatively low flow-rate volume is provided for the accumulation of larger material with the cartridge and of fine particles that pass the filter membrane, the fine particles being permitted to settle under gravity and collect at the lower region of the shell adjacent the second end from which both the larger materials and the fine particles can be periodically flushed.

2. A filter as in claim 1 wherein said first sealing means for detachably coupling one end of the filter cartridge to the inlet includes means forming an inwardly facing circumferential recess and a resilient seal of chevron cross section carried by said recess and adapted to be radially compressed to effect a seal with the filter cartridge and to support that end of the same, and wherein said second sealing means includes means forming a second inwardly facing circumferential recess, a second seal of chevron cross section carried in said recess, said second seal adapted to be radially compressed by portions of the head assembly to effect a seal therewith, said second sealing means and second seal being larger than the lateral dimension of said filter cartridge to permit free movement of the cartridge into and out of said shell, each of said seals being arranged to open toward the inlet.

3. A liquid filter as in claim 2 in which the head assembly comprises a flange and concentric pipe sections secured to the inner side of the flange, the membrane being secured to the inner one of the pipe sections, said second seal ring forming a seal with the outer one of the pipe sections.

4. A liquid filter as in claim 1 in which the inlet end of said filter cartridge is provided with a plurality of vanes for imparting a swirling motion to moving fluids entering into the inner flow passageway within said filter cartridge.

5. A liquid pressure filter for use in water supply system comprising an elongate shell having first and second ends, means forming a liquid inlet at the first end and adapted to be connected to a source of liquid under pressure, means forming a discharge outlet communicating through the side of the shell and spaced a substantial distance from the second end of the shell, an elongate filter cartridge disposed axially within the shell and extending substantially the length thereof, said cartridge including a filter membrane surrounding substantially free inner flow passageway that extends the length of the cartridge, sealing means detachably coupling one end of the filter cartridge to the inlet opening, said sealing means including means forming an inwardly facing circumferential recess, a resilient seal-ring having chevron cross section disposed in said recess so as to open toward said inlet opening so as to be adapted to be radially compressed to effect a seal with the respective end of the filter cartridge and to support the same, a head assembly for detachably coupling the other end of the filter cartridge to the adjacent end of the shell, said head assembly comprising a flange plate and concentric pipe sections secured to the inner side of the flange plate, the membrane being secured to the inner one of the pipe sections, means forming an inwardly facing circumferential recess surrounding the outer pipe section at the flush end of the shell, a resilient seal-ring of chevron cross section disposed in said last named recess and arranged to open toward said inlet end of the shell, said last named means and second seal-ring being of larger lateral dimension than the filter cartridge to permit free movement of the cartridge into and out of said shell, a plurality of bars extending between the shell and the means for detachably coupling the cartridge to the inlet opening, said bars being inclined towards said opening so that the inlet end of said filter cartridge is guided into a position within the chevron seal as it is pushed into said shell, and vane means mounted at the inlet end of the cartridge for imparting a swirling motion to liquid entering the passageway within said filter cartridge.

References Cited

UNITED STATES PATENTS

| | | | |
|---|---|---|---|
| 267,024 | 11/1882 | See | 210—433 X |
| 550,583 | 12/1895 | Brinckman et al. | 210—433 X |
| 796,266 | 8/1905 | Sutton | 210—450 |
| 2,198,819 | 4/1940 | Holm | 210—304 |
| 2,348,925 | 5/1944 | Reichhelm | 210—236 |
| 2,583,522 | 1/1952 | Winslow et al. | 210—451 X |
| 2,658,622 | 11/1953 | Thornhill | 210—409 |
| 2,757,800 | 8/1956 | Kucera | 210—433 X |
| 2,801,764 | 8/1957 | Russell et al. | 220—46 |
| 2,828,863 | 4/1958 | Van Lier et al. | 210—131 X |
| 768,951 | 8/1904 | Rawson | 210—450 |
| 1,271,681 | 7/1918 | Duryea | 210—304 |
| 2,017,350 | 10/1935 | Morgan | 210—454 X |
| 3,088,305 | 5/1963 | Ohmann | 210—454 X |

REUBEN FRIEDMAN, *Primary Examiner.*

F. SPEAR, *Assistant Examiner.*